(12) United States Patent
Melnik et al.

(10) Patent No.: US 11,829,192 B2
(45) Date of Patent: Nov. 28, 2023

(54) METHOD, APPARATUS, AND COMPUTER PROGRAM PRODUCT FOR CHANGE DETECTION BASED ON DIGITAL SIGNATURES

(71) Applicant: HERE Global B.V., Eindhoven (NL)

(72) Inventors: Ofer Melnik, Weehawken, NJ (US); Alastair Sutherland, Seattle, WA (US)

(73) Assignee: HERE GLOBAL B.V., Eindhoven (NL)

( * ) Notice: Subject to any disclaimer, the term of this patent is extended or adjusted under 35 U.S.C. 154(b) by 266 days.

(21) Appl. No.: 17/132,860

(22) Filed: Dec. 23, 2020

(65) Prior Publication Data

US 2022/0198215 A1 Jun. 23, 2022

(51) Int. Cl.
*G06F 18/22* (2023.01)
*G06N 20/00* (2019.01)
(Continued)

(52) U.S. Cl.
CPC ............. *G06F 18/22* (2023.01); *G06F 18/28* (2023.01); *G06N 20/00* (2019.01); *G06V 10/40* (2022.01); *G06V 10/751* (2022.01)

(58) Field of Classification Search
CPC ......... G06F 18/22; G06F 18/28; G06N 20/00; G06V 10/40; G06V 10/751; G06V 10/82; G06V 20/52
See application file for complete search history.

(56) References Cited

U.S. PATENT DOCUMENTS 8,131,118 B1 3/2012 Jing et al.
8,625,902 B2 1/2014 Baheti et al.
(Continued)

FOREIGN PATENT DOCUMENTS

CN 101535986 A 9/2009
CN 110263746 A 9/2019
(Continued)

OTHER PUBLICATIONS

M. Sagrebin and J. Pauli, "Real-Time Moving Object Detection for Video Surveillance," 2009 Sixth IEEE International Conference on Advanced Video and Signal Based Surveillance, Genova, Italy, 2009, pp. 31-36, doi: 10.1109/AVSS.2009.18. (Year: 2009).*
(Continued)

*Primary Examiner* — Edward F Urban
*Assistant Examiner* — Wassim Mahrouka
(74) *Attorney, Agent, or Firm* — ALSTON & BIRD LLP

(57) ABSTRACT

A method, apparatus and computer program utilize digital signatures to accurately and efficiently identify changes to objects of interest within captured images. In the context of a method, a digital signature is obtained for an object of interest at a particular location. The method also determines whether a difference between the digital signature and a previously determined digital signature associated with the location satisfies a predefined criterion. In accordance with determining that the difference fails to satisfy the predefined criterion, the method causes information regarding the object of interest at the particular location to be collected, such as to permit a map that references the object of interest or other information associated with the object of interest to be updated.

20 Claims, 5 Drawing Sheets

(51) Int. Cl.
  *G06V 10/40* (2022.01)
  *G06V 10/75* (2022.01)
  *G06F 18/28* (2023.01)

(56) References Cited

U.S. PATENT DOCUMENTS

| | | | |
|---|---|---|---|
| 10,452,071 B1* | 10/2019 | Ebrahimi Afrouzi | G06V 10/751 |
| 10,726,312 B2 | 7/2020 | Butt et al. | |
| 10,916,001 B2 | 2/2021 | Lu et al. | |
| 11,113,587 B2 | 9/2021 | Butt et al. | |
| 2007/0005571 A1 | 1/2007 | Brewer et al. | |
| 2011/0060666 A1 | 3/2011 | Gromek et al. | |
| 2011/0135191 A1 | 6/2011 | Lyuh et al. | |
| 2012/0027290 A1 | 2/2012 | Baheti et al. | |
| 2012/0166074 A1 | 6/2012 | Weng et al. | |
| 2012/0294520 A1 | 11/2012 | Mei et al. | |
| 2014/0133310 A1 | 5/2014 | Pau | |
| 2014/0281945 A1 | 9/2014 | Avni et al. | |
| 2015/0278224 A1 | 10/2015 | Jaber et al. | |
| 2016/0300118 A1 | 10/2016 | Murray et al. | |
| 2018/0101730 A1 | 4/2018 | Wu | |
| 2018/0137551 A1 | 5/2018 | Zheng et al. | |
| 2018/0157939 A1 | 6/2018 | Butt et al. | |
| 2018/0204083 A1 | 7/2018 | Goyal et al. | |
| 2018/0225514 A1 | 8/2018 | Anastassacos et al. | |
| 2018/0227482 A1 | 8/2018 | Holzer et al. | |
| 2018/0373959 A1 | 12/2018 | Rhoads et al. | |
| 2019/0073553 A1 | 3/2019 | Yao et al. | |
| 2019/0122072 A1* | 4/2019 | Cricri | G06V 10/764 |
| 2019/0147655 A1 | 5/2019 | Galera et al. | |
| 2019/0272284 A1 | 9/2019 | Jaber et al. | |
| 2019/0302290 A1 | 10/2019 | Alwon | |
| 2019/0303725 A1 | 10/2019 | Gurvich et al. | |
| 2020/0005542 A1 | 1/2020 | Kocharlakota et al. | |
| 2020/0183047 A1 | 6/2020 | Denli et al. | |
| 2020/0193206 A1 | 6/2020 | Turkelson et al. | |
| 2020/0234466 A1 | 7/2020 | Holzer et al. | |
| 2020/0320356 A1 | 10/2020 | Butt et al. | |
| 2020/0401617 A1 | 12/2020 | Spiegel et al. | |
| 2020/0402541 A1 | 12/2020 | Talbot et al. | |
| 2021/0004589 A1 | 1/2021 | Turkelson et al. | |
| 2021/0056761 A1 | 2/2021 | Nigam et al. | |
| 2021/0141793 A1 | 5/2021 | Kar et al. | |
| 2021/0174113 A1 | 6/2021 | Shin et al. | |
| 2021/0335050 A1 | 10/2021 | Zavesky et al. | |
| 2022/0188346 A1 | 6/2022 | Melnik et al. | |
| 2022/0198215 A1 | 6/2022 | Melnik et al. | |
| 2022/0198701 A1 | 6/2022 | Melnik et al. | |
| 2022/0198721 A1 | 6/2022 | Melnik et al. | |
| 2023/0186517 A1 | 6/2023 | Melnik et al. | |

FOREIGN PATENT DOCUMENTS

| | | |
|---|---|---|
| KR | 102266996 B1 | 6/2021 |
| WO | WO 2017/156043 A1 | 9/2017 |
| WO | WO 2018/031050 A1 | 2/2018 |
| WO | WO 2020/020472 A1 | 1/2020 |

OTHER PUBLICATIONS

Alfarrarjeh et al, "A Data-Centric Approach for Image Scene Localization", 2018 IEEE International Conference on Big Data, (Dec. 10-13, 2018), pp. 594-603.

Extended European Search Report for European Application No. 21214679.9 dated May 13, 2022, 12 pages.
Extended European Search Report for European Application No. 21214761.5 dated May 13, 2022, 12 pages.
Extended European Search Report for European Application No. 21216006.3 dated May 23, 2022, 8 pages.
Extended European Search Report for European Application No. 21216037.8 dated Jun. 7, 2022, 7 pages.
Hu et al, "ALPS Accurate Landmark Positioning at City Scales", ACM International Joint Conference on Pervasive and Ubiquitous Computing (UbiComp 2016), (Jul. 2016), 12 pages.
Luo et al, "Geotagging in Multimedia and Computer Vision—A Survey", Multimed Tools Appl, (Oct. 19, 2010), 25 pages.
Sagrebin et al., "Real-Time Moving Object Detection for Video Surveillance", 2009 Sixth IEEE International Conference on Advanced Video and Signal Based Surveillance, (Sep. 2-4, 2009), 6 pages.
Zhang et al., "Parallel Connecting Deep Shallow CNNs for Simultaneous Detection of Big and Small Objects", Pattern Recognition and Computer Vision (PRCV 2018), Lecture Notes in Computer Science, (Nov. 2, 2018), 12 pages.
Office Action for U.S. Appl. No. 17/123,485 dated Aug. 2, 2022.
Notice of Allowance for U.S. Appl. No. 17/132,876 dated Aug. 25, 2022.
Nirikin et al, "HyperSeg: Patch-Wise Hypernetwork for Real-Time Semantic Segmentation", 2021 IEEE/CVF Conference on Computer Vision and Pattern Recognition (CVPR), arXiv:2012. 11582v2, (Apr. 8, 2021), 15 pages.
Chaudhuly et al., Auto-Rectification Of Users Photos, https://static.googleusercontent.com/media/research.google.com/en//pubs/archive/42532.pdf.
U.S. Appl. No. 17/123,935, filed Dec. 16, 2020, In re: Melnik et al. entitled, "Method, Apparatus, And Computer Program Product For Training A Signature Encoding Module And A Query Processing Module To Identify Objects Of Interest Within An Image Utilizing Digital Signatures".
U.S. Appl. No. 17/123,485, filed Dec. 16, 2020, In re: Melnik et al. entitled, "Method, Apparatus, And Computer Program Product For Identifying Objects Of Interest Within An Image Captured By A Relocatable Image Capture Device".
U.S. Appl. No. 17/132,911, filed Dec. 23, 2020, In re: Melnik et al. entitled, "Method, Apparatus, And Computer Program Product For Training A Signature Encoding Module And A Query Processing Module Using Augmented Data".
U.S. Appl. No. 17/132,876, filed Dec. 23, 2020, In re: Melnik et al. entitled, "Method, Apparatus, And Computer Program Product For Displaying Virtual Graphical Data Based On Digital Signatures".
Notice of Allowance for U.S. Appl. No. 17/132,876 dated Oct. 19, 2022.
Final Office Action for U.S. Appl. No. 17/123,485 dated Dec. 5, 2022.
Office Action for U.S. Appl. No. 17/123,935 dated May 10, 2023.
Non-Final Office Action for U.S. Appl. No. 17/132,911 dated Mar. 6, 2023.
Non-Final Office Action for U.S. Appl. No. 17/123,485 dated Jul. 25, 2023.
Notice of Allowance for U.S. Appl. No. 17/132,911 dated Jul. 12, 2023.
Corrected Notice of Allowance for U.S. Appl. No. 17/132,911 dated Jul. 20, 2023.
Notice of Allowance for U.S. Appl. No. 17/123,935 dated Sep. 25, 2023.
Extended European Search Report for European Application No. 22211724.4 dated Apr. 13, 2023, 11 pages.

* cited by examiner

METHOD, APPARATUS, AND COMPUTER PROGRAM PRODUCT FOR CHANGE DETECTION BASED ON DIGITAL SIGNATURES

TECHNOLOGICAL FIELD

An example embodiment relates generally to a method, apparatus, and computer program product for programmatically detecting changes to real-world entities and, more particularly, for programmatically detecting changes to real-world entities by utilizing digital signatures.

BACKGROUND

Models and/or mappings of portions of the world are generated for various purposes such as navigation, routing and/or the like. Over time, it is likely that certain locations may change in appearance to some degree. For example, an office building may be demolished and a parking garage may be built in its place. In another example, and to a lesser extent, a gas station may change branding, such that the same physical structure of the gas station is maintained while the colors and/or signage of the gas station are updated. This dynamic state of the world typically results in models and/or mappings that quickly become out-of-date and decrease in usefulness.

BRIEF SUMMARY

A method, apparatus and computer program product are therefore provided in accordance with an example embodiment in order to utilize digital signatures to accurately and efficiently identify changes to objects of interest within images and cause revision to stored digital signatures representative of the objects of interest such that models and/or mappings may be maintained and updated in real-time. Embodiments herein may utilize portable compact signatures that allow objects of interest to be recognized within images in an efficient manner. As such, real-time or near real-time detection of such objects and regions within images and subsequent detection of mismatches between digital signatures may be performed faster, more accurately, and more efficiently than other approaches, such as approaches that utilize three-dimensional (3D) models and perform 3D localization for data stored in a 3D point cloud, which require, for example, more extensive back end processing.

In an embodiment, a method is provided comprising obtaining a digital signature for an object of interest at a particular location. The method also includes determining whether a difference between the digital signature and a previously determined digital signature associated with the particular location satisfies a predefined criterion. In accordance with determining that the difference fails to satisfy the predefined criterion, the method causes information regarding the object of interest at the particular location to be collected.

In some embodiments of the method, obtaining the digital signature for the object of interest at the particular location includes receiving one or more images comprising the object of interest generated by an image capture device and determining the digital signature for the object of interest utilizing a deep learning model comprising a signature encoding module. In an alternative embodiment, the method obtains the digital signature for the object of interest of the particular location by receiving the digital signature from a client device.

The method of an example embodiment also includes identifying the previously determined digital signature that is associated with the particular location prior to determining the difference between the digital signature and the previously determined digital signature. In some embodiments, the method also includes determining the difference between the digital signature and the previously determined digital signature. In this regard, the method determines the difference by applying a distance function to the digital signature and the previously determined digital signature. The difference comprises a result of the distance function.

The method of an example embodiment also includes causing an indication of a mismatch between the digital signature and the previously determined digital signature to be signaled in an instance in which the difference fails to satisfy the predefined criterion. In some embodiments, the method also includes, in accordance with determining that the difference fails to satisfy the predefined criterion, causing the digital signature, as opposed the previously determined digital signature, to be associated with the particular location. The method of an example embodiment also includes requiring a plurality of mismatches between the digital signature and the previously determined digital signature in which the difference fails to satisfy the predefined criterion over a predefined period of time prior to causing information regarding the object of interest at the particular location to be collected.

The method of an example embodiment causes information regarding the object of interest at the particular location to be collected by processing the one or more images to extract one or more features of the object of interest. In some embodiments of the method, causing information regarding the object of interest at the particular location to be collected also comprises storing an indication of the one or more features in association with the object of interest. The digital signature and the previously determined digital signature may each be based on respective images of the object of interest captured from a same viewing direction.

In another embodiment, an apparatus is provided that includes processing circuitry and at least one memory including computer program code instructions with the computer program code instructions being configured to, when executed by the processing circuity, cause the apparatus to obtain a digital signature for an object of interest at a particular location. The computer program code instructions are also configured to, when executed by the processing circuity, cause the apparatus to determine whether a difference between the digital signature and a previously determined digital signature associated with the particular location satisfies a predefined criterion. The computer program code instructions are configured to, when executed by the processing circuity, cause the apparatus to in accordance with determining that the difference fails to satisfy the predefined criterion, cause information regarding the object of interest at the particular location to be collected.

The apparatus of an example embodiment is caused to obtain the digital signature for the object at interest of the particular location by receiving one or more images comprising the object of interest generated by an image capture device and determining the digital signature for the object of interest utilizing a deep learning model comprising a signature encoding module. In some embodiments, the computer program code instructions are further configured to, when executed by the processing circuity, cause the apparatus to identify the previously determined digital signature that is associated with the particular location prior to determining the difference between the digital signature and the previously determined digital signature. The computer program code instructions of an example embodiment are further configured to, when executed by the processing circuitry, cause the apparatus to determine the difference between the digital signature and the previously determined digital signature. In this example embodiment, the apparatus is caused to determine the difference by applying a distance function to the digital signature and the previously determined digital signature with the difference comprising a result of the distance function.

In some embodiments, the computer program code instructions are further configured to, when executed by the processing circuitry, cause the apparatus to cause an indication of a mismatch between the digital signature and the previously determined digital signature to be signaled in an instance in which the difference fails to satisfy the predefined criterion. The computer program code instructions of an example embodiment are further configured to, when executed by the processing circuitry, cause the apparatus to, in accordance with determining that the difference fails to satisfy the predefined criterion, cause to the digital signature, as opposed to the previously determined digital signature, to be associated with the particular location.

The computer program code instructions of an example embodiment are further configured to, when executed by the processing circuitry, cause the apparatus to require a plurality of mismatches between the digital signature and the previously determined digital signature in which the difference fails to satisfy the predefined criterion over a predefined period of time prior to causing information regarding the object of interest at the particular location to be collected. In some embodiments, the computer program code instructions that are configured to cause information regarding the object of interest at the particular location to be collected are further configured to, when executed by the processing circuitry, cause the apparatus to process the one or more images to extract one or more features of the object of interest. The computer program code instructions that are configured to cause information regarding the object of interest at the particular location to be collected may be further configured to, when executed by the processing circuitry, cause the apparatus to store an indication of the one or more features in association with the object of interest. The digital signature and the previously determined digital signature may each be based on respective images of the object of interest captured from a same viewing direction.

In a further embodiment, a computer program product is provided that includes at least one non-transitory computer-readable storage medium having computer-executable program code instructions stored therein with the computer-executable program code instructions including program code instructions configured to obtain a digital signature for an object of interest at a particular location. The computer-executable program code instructions also comprise program code instructions configured to determine whether a difference between the digital signature and a previously determined digital signature associated with the particular location satisfies a predefined criterion. The computer-executable program code instructions also comprise program code instructions configured to, in accordance with determining that the difference fails to satisfy the predefined criterion, cause information regarding the object of interest at the particular location to be collected.

The program code instructions configured to obtain the digital signature for the object of interest of the particular location may include program code instructions configured to receive one or more images including the object of interest generated by an image capture device and program code instructions configured to determine the digital signature for the object of interest utilizing a deep learning model comprising a signature encoding module. In some embodiments, the computer-executable program code instructions also comprise program code instructions configured to identify the previously determined digital signature that is associated with the particular location prior to determining the difference between the digital signature and the previously determined digital signature. The computer-executable program code instructions of some example embodiments also comprise program code instructions configured to determine the difference between the digital signature and the previously determined digital signature by applying a distance function to the digital signature and the previously determined digital signature. The difference comprises a result of the distance function.

The computer-executable program code instructions of an example embodiment also comprise program code instructions configured to cause an indication of a mismatch between the digital signature and the previously determined digital signature to be signaled in an instance in which the difference fails to satisfy the predefined criterion. In some embodiments, the computer-executable program code instructions also comprise program code instructions configured to, in accordance with determining that the difference fails to satisfy the predefined criterion, cause to the digital signature, as opposed to the previously determined digital signature, to be associated with the particular location. The computer-executable program code instructions of an example embodiment also comprise program code instructions configured to require a plurality of mismatches between the digital signature and the previously determined digital signature in which the difference fails to satisfy the predefined criterion over a predefined period of time prior to causing information regarding the object of interest at the particular location to be collected.

In some embodiments, the program code instructions configured to cause information regarding the object of interest at the particular location to be collected are further configured to process the one or more images to extract one or more features of the object of interest. The program code instructions configured to cause information regarding the object of interest at the particular location to be collected are further configured in an example embodiment to store an indication of the one or more features in association with the object of interest. The digital signature and the previously determined digital signature may each be based on respective images of the object of interest captured from a same viewing direction.

In yet another example embodiment, an apparatus is provided comprising means for obtaining a digital signature for an object of interest at a particular location. The apparatus also includes means for determining whether a difference between the digital signature and a previously determined digital signature associated with the particular location satisfies a predefined criterion. In accordance with determining that the difference fails to satisfy the predefined criterion, the apparatus includes means for causing information regarding the object of interest at the particular location to be collected.

In some embodiments of the apparatus, the means for obtaining the digital signature for the object of interest at the particular location includes means for receiving one or more images comprising the object of interest generated by an image capture device and means for determining the digital signature for the object of interest utilizing a deep learning model comprising a signature encoding module. In an alternative embodiment, the means for obtaining the digital signature for the object of interest of the particular location includes means for receiving the digital signature from a client device.

The apparatus of an example embodiment also includes means for identifying the previously determined digital signature that is associated with the particular location prior to determining the difference between the digital signature and the previously determined digital signature. In some embodiments, the apparatus also includes means for determining the difference between the digital signature and the previously determined digital signature. In this regard, the means for determining the difference includes means for applying a distance function to the digital signature and the previously determined digital signature. The difference comprises a result of the distance function.

The apparatus of an example embodiment also includes means for causing an indication of a mismatch between the digital signature and the previously determined digital signature to be signaled in an instance in which the difference fails to satisfy the predefined criterion. In some embodiments, the apparatus also includes means, in accordance with determining that the difference fails to satisfy the predefined criterion, for causing the digital signature, as opposed the previously determined digital signature, to be associated with the particular location. The apparatus of an example embodiment also includes means for requiring a plurality of mismatches between the digital signature and the previously determined digital signature in which the difference fails to satisfy the predefined criterion over a predefined period of time prior to causing information regarding the object of interest at the particular location to be collected.

The means for causing information regarding the object of interest at the particular location to be collected may include means for processing the one or more images to extract one or more features of the object of interest. In some embodiments of the apparatus, the means for causing information regarding the object of interest at the particular location to be collected also comprises means for storing an indication of the one or more features in association with the object of interest. The digital signature and the previously determined digital signature may each be based on respective images of the object of interest captured from a same viewing direction.

BRIEF DESCRIPTION OF THE DRAWINGS

Figure 1:
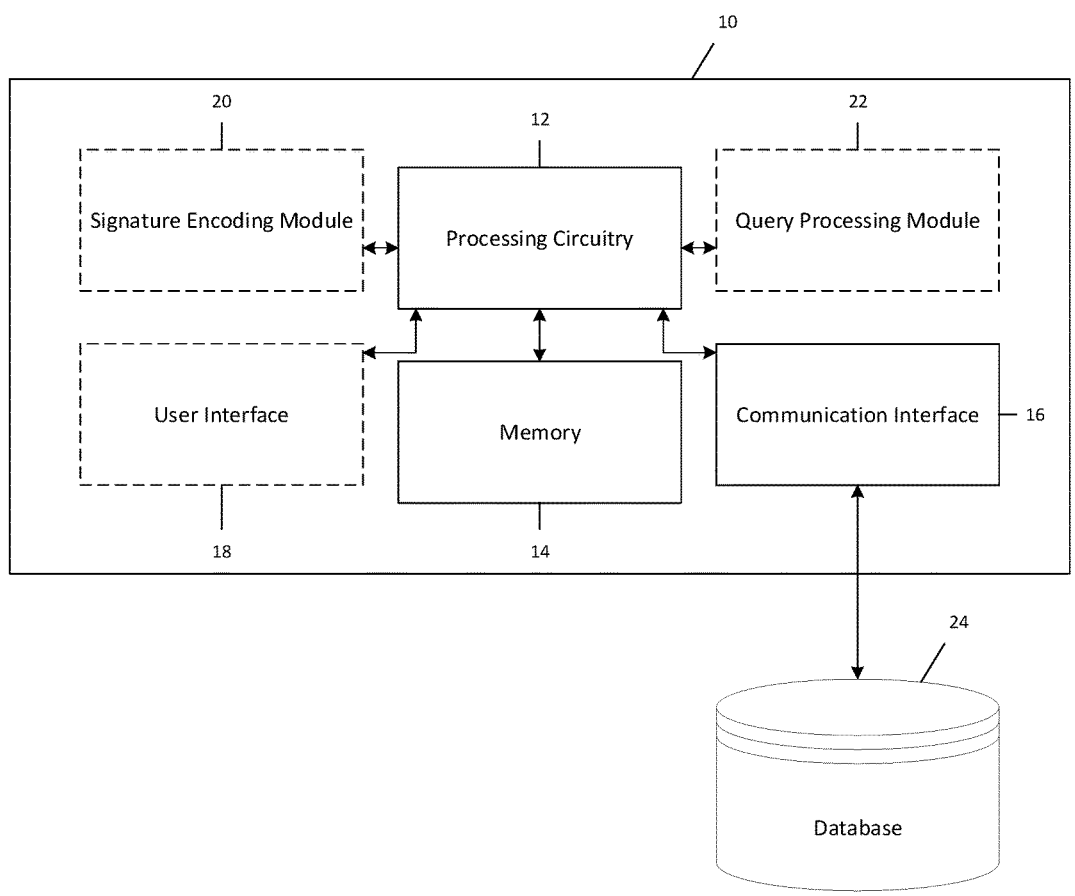
Figure 2A:
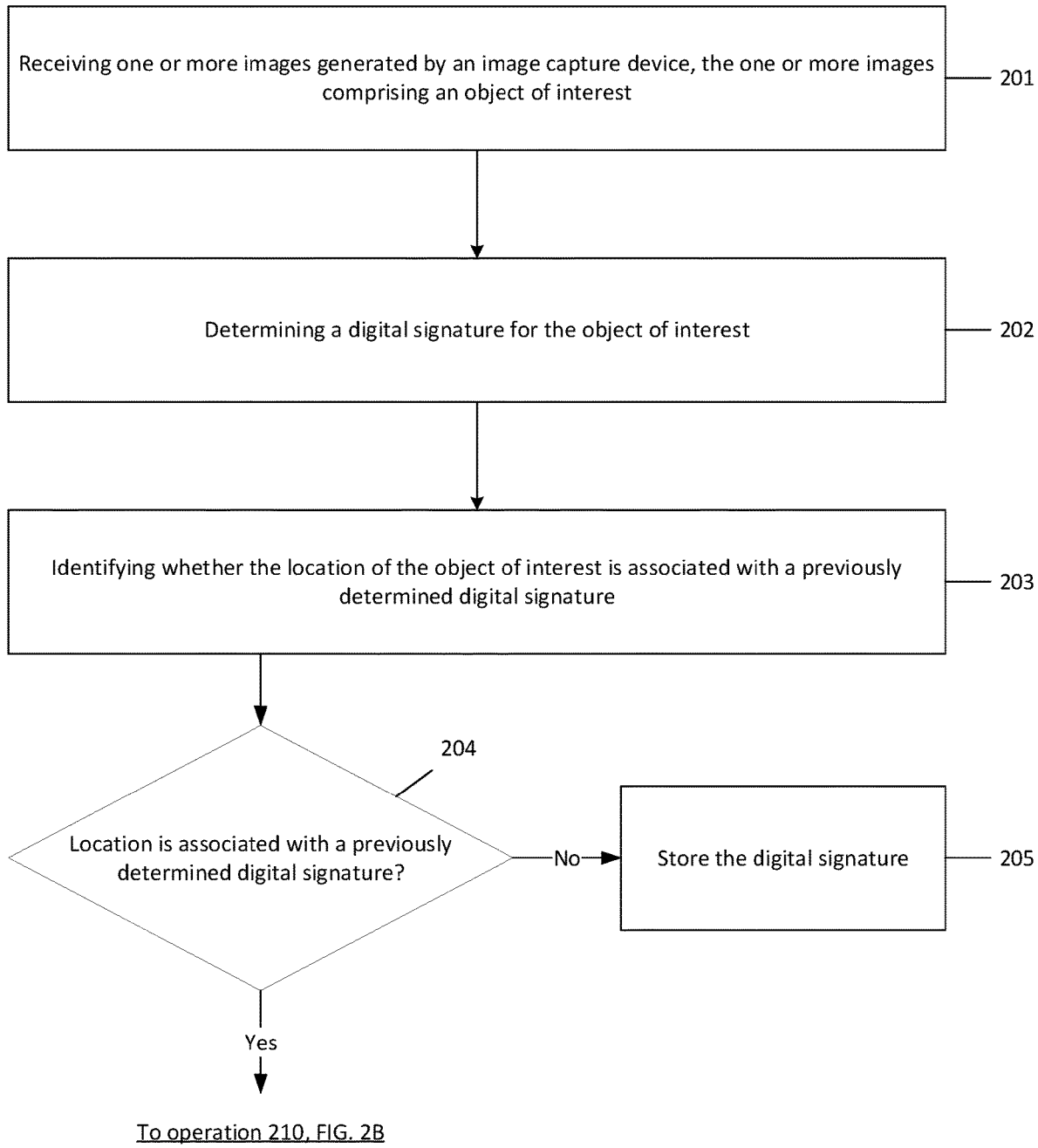
Figure 2B:
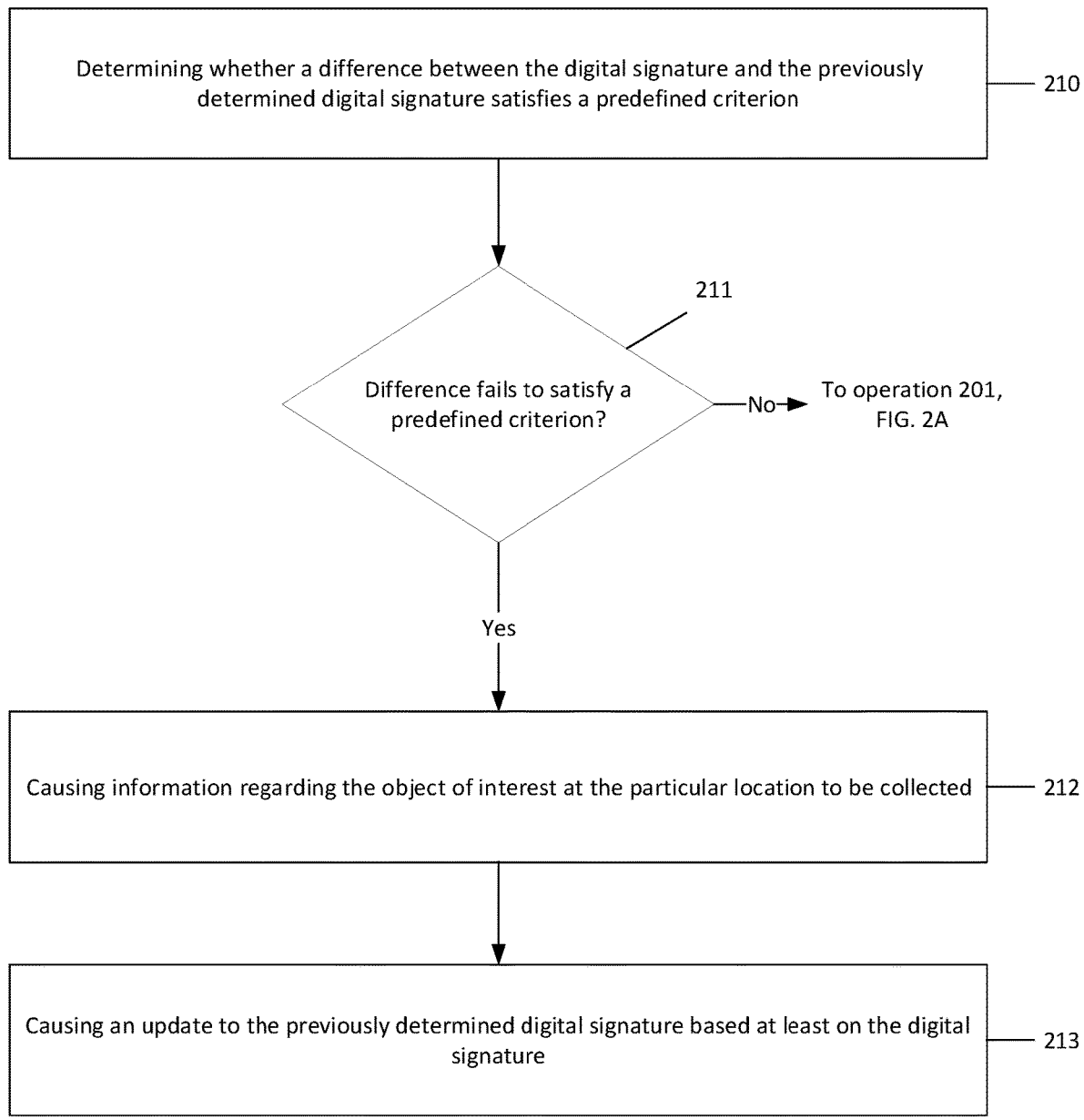
Figure 3:
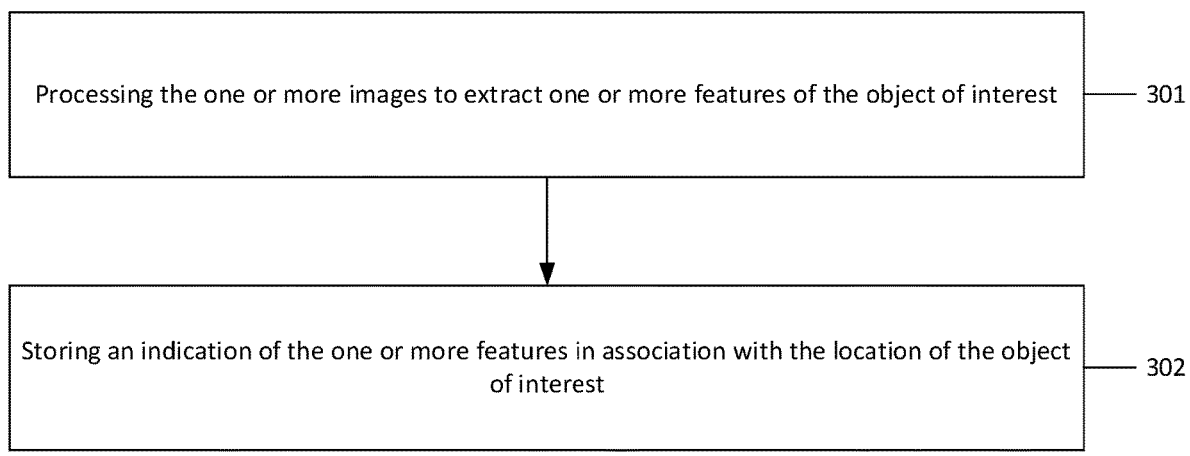
Figure 4:
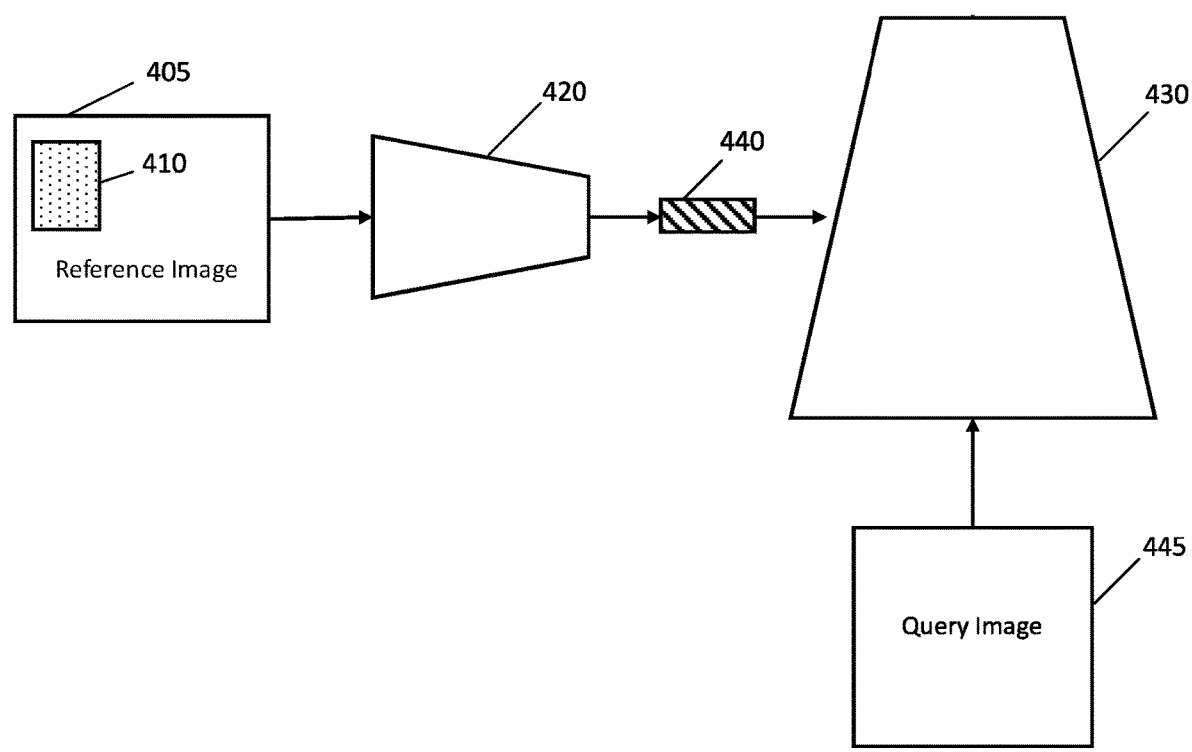

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIGS. 2A and 2B are flowcharts illustrating the operations performed, such as by the apparatus of FIG. 1, in accordance with an example embodiment;

FIG. 3 is a flowchart illustrating the operations performed, such as by the apparatus of FIG. 1, in accordance with another example embodiment; and FIG. 4 is a graphical representation of operations performed, such as by the apparatus of FIG. 1, for training a signature encoding module and query processing module in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to utilize digital signatures to accurately and efficiently identify changes to objects of interest within captured images based on changes in the digital signatures representative of the objects of interest. Based upon the changes to objects of interest, models and/or mappings that reference the objects of interest may be maintained and updated in real-time. In addition, the digital signature representative of a particular location at which an object of interest has changed may also be updated. In some embodiments, the object of interest within the image is identified by a query processing module comprising a neural network that has been trained as described below to recognize the object of interest utilizing the respective digital signature of the one or more objects of interest and, in some embodiments, at least some context associated with the one or more objects of interest that are depicted by one or more reference images. In this regard, the method, apparatus, and computer program product may be configured to utilize a trained query processing module to identify objects of interest within an image. Although described herein to represent an object of interest and at least some context associated with the object of interest, a digital signature need not represent context associated with the object of interest and, in other embodiments, may exclusively represent an object of interest. Thus, the following discussion relating to an object of interest and context associated with the object of interest is equally applicable with respect to consideration of an object of interest itself without consideration of any associated context.

The apparatus that is configured to efficiently identify changes to objects of interest within captured images and cause updates to or replacement of stored digital signatures may be embodied by any of a wide variety of computing devices. For example, the apparatus may be embodied by a server, a computer workstation, a distributed network of computing devices, a personal computer, a navigation or mapping system, or any other type of computing device.

Regardless of the manner in which the apparatus is embodied, however, the apparatus 10 includes, is associated with, or is in communication with processing circuitry 12, memory 14, a communication interface 16, a query processing module 22, and optionally a user interface 18 and a signature encoding module 20, as shown in FIG. 1. In some embodiments, the processing circuitry 12 (and/or co-processors or any other processors assisting or otherwise associated with the processing circuitry) can be in communication with the memory 14 via a bus for passing information among components of the apparatus. The memory 14 can be non-transitory and can include, for example, one or more volatile and/or non-volatile memories. In other words, for example, the memory 14 may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory 14 can be configured to buffer input data for processing by the processing circuitry 12. Additionally or alternatively, the memory can be configured to store instructions for execution by the processing circuitry.

The processing circuitry 12 can be embodied in a number of different ways. For example, the processing circuitry 12 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 12 can include one or more processing cores configured to perform independently. A multi-core processor can enable multiprocessing within a single physical package. Additionally or alternatively, the processing circuitry 12 can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry 12 can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., map data, route data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to infrastructure wireless links.

Although not illustrated, the apparatus 10 may also include or be in communication with one or more a positioning system, such as a global positioning system (GPS) and/or other localization system. As such, the apparatus 10, such as the processing circuitry 12, may be configured to determine its location, such as upon capture of an image, based upon information provided by the positioning system.

The apparatus 10 may also optionally comprise a signature encoding module 20. The signature encoding module may be configured to perform operations associated with generating a digital signature of an object of interest and associated context. As described below, during training, the signature encoding module 20 may receive, as input, a reference image that includes an object of interest that has been demarcated and be trained to provide, as output, a digital signature representing the object of interest and at least some of the context associated with the object of interest.

The apparatus 10 may also comprise a query processing module 22. The query processing module 22 may be configured to perform operations associated with identifying an object of interest within an image based upon respective digital signatures of one or more objects of interest and at least some context associated with the one or more objects of interest that are depicted by one or more reference images. The query processing module 22 may be a trained to identify objects of interest within images. As described in more detail below, during training, the query processing module may receive, as input, one or more query images in addition to a digital signature of a respective object of interest, such as a digital signature generated by the signature encoding module 20 and stored by the memory 14 and/or a database 24. Based thereupon, the query processing module may be trained to predict a location in the one or more query images that contains the object of interest. Once trained, the query processing module may be configured to efficiently identify an object of interest within an image based upon respective digital signatures of one or more objects of interest and at least some context associated with the one or more objects of interest that are depicted by one or more reference images.

Although depicted in FIG. 1 to be distinct from the processing circuitry 12, the signature encoding module 20 and/or the query processing module 22 may be embodied by the processing circuitry in other example embodiments.

In some embodiments, the database 24 may be configured to store representations of a plurality of images and associated metadata. In some embodiments, the representations of the plurality of images may be encoded representations, such as the hash codes, generated for the respective images, although different or additional representations of the images may be stored in the database in other embodiments including storage of the images themselves. The metadata for the plurality of images may comprise location data (e.g., GPS coordinates) that defines the location at which the image was taken, time and date information indicative of a time and/or date at which an image was captured. The metadata for the plurality of images may also comprise camera-related information, such as a camera orientation at the time that the image was captured and/or other camera-related information.

The database 24 may also store one or more digital signatures associated with respective images. The digital signatures are representative of an object of interest within a respective image, as well as at least some of the context associated with the object of interest within the image. One or more digital signatures may be associated with each image. In an embodiment in which multiple digital signatures are associated with a respective image, each digital signature may be representative of a different object of interest and at least some context associated therewith within the object of interest. The digital signatures may have been generated by the signature encoding module 20, as described in more detail below.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Referring now to FIG. 2A, the operations performed, such as by the apparatus 10 of FIG. 1, in order to identify changes to objects of interest and cause updates to or replacement of stored digital signatures associated with the objects of interest such that models and/or mapping that reference or are otherwise dependent upon the objects of interest may be maintained and updated in real-time are depicted. As shown in block 201, the apparatus includes means, such as the processing circuitry 12, memory 14, communication interface 16, and/or the like, for receiving one or more images generated by an image capture device. The one or more images include an object of interest. The one or more images may be received from a source external to and in communication with the apparatus (e.g., by way of communication interface 16), such as an image capture device, or, in some embodiments, the image may be received from the database 24 or memory 14 that store one or more images captured by the image capture device, and/or from other sources. Although the apparatus may receive a plurality of images that are processed concurrently or in combination with one another, the apparatus will be described below in relation to the receipt and processing of single image by way of example, but not of limitation.

For example, the image may be a photograph or frame of a video generated by an image capture device, such as a camera, video camera, or the like. In some embodiments, the image capture device may be an image capture device that is configured to be relocated. In this regard, the image capture device may be relocated due to the image capture device being stationed onboard, carried by or embodied by a moving entity, such as a vehicle, person, or the like. For example, the image may depict real-world content and may include one or more objects of interest that can be identified by embodiments described herein.

In some embodiments, the apparatus 10 includes means, such as the processing circuitry 12, memory 14, communication interface 16, and/or the like, for receiving information regarding an estimated location of the image capture device and/or the object of interest, such as based upon information provided by an associated positioning system. For example, in some embodiments, the image that is received may be associated with metadata comprising information about the image. For example, the metadata may include location data indicative of a location at which the image was generated. As one example, the location data may comprise a pair of coordinates (e.g., latitudinal/longitudinal coordinates) provided by a positioning system carried by the image capture device indicative of a particular location at which the image was generated, such as the location of the image capture device at the time that the image was captured, and/or an estimation of the location of the object of interest. Additional metadata may include information related to a position and/or an orientation of the image capture device at the time the image was generated, and/or historical information related to one or more previous locations of the image capture device.

In some embodiments, the apparatus 10 includes means, such as the processing circuitry 12, memory 14, and/or the like, for determining the estimated location of the object of interest based on data associated with the received image. For example, metadata associated with the image as described above and information associated with previous locations of the image capture device (e.g., based on location data of previous images taken by the image capture device) may be combined using a filter, such as a Kalman filter, in order to determine an estimated location of the object of interest captured by the image capture device.

At operation 202, the apparatus 10 includes means, such as the processing circuitry 12, memory 14, signature encoding module 20, query processing module 22, and/or the like, for, determining a digital signature for the object of interest. For example, a digital signature for an object within the image may be determined for the object and, in some embodiments, for at least some context associated with the object. In some embodiments, an object within the image may be automatically identified, e.g., through one or more image recognition processes. In some embodiments, an object within the image may be demarcated, e.g., by a user operating the image capture device, prior to the image being received by the apparatus 10. The object within the image may be demarcated in various ways. For example, in some embodiments, the image may be demarcated using an image mask.

Although the digital signature may relate solely to the object of interest, the digital signature of some embodiments relates to the object of interest and some context associated with the object of interest, thereby permitting objects of interest with similar appearances to be distinguished. As described herein, "context" may refer to a portion of an image that is near to, such as by being adjacent to, proximate or surrounding, the object of interest. For example, in an instance in which the object of interest in an image is a particular building, the context may comprise one or more buildings or other objects that are in close proximity to the particular building. In an embodiment in which the object of interest is demarcated, such as with an image mask, the context is generally represented by a portion of the reference image that is outside of, but adjacent or otherwise proximate or near to the image mask. Embodiments herein describe an object of interest that is stationary (e.g., a building, structure, home, apartment building, business storefront, etc.), as well as context surrounding the object of interest being also stationary (e.g., neighboring buildings, locations, or the like). Since the object of interest is stationary, the stationary context surrounding the object of interest may be considered in conjunction with the identification of the object of interest in contrast to the identification or recognition of mobile or deformable objects of interest, which cannot rely upon the context in the vicinity thereof since the context may change based upon the mobility or deformability of these other object of interest. The context is typically implicit and need not be specifically designated as such.

In some embodiments, the digital signature may be generated using a signature encoding module 20, further described below, that may be embodied by a deep learning model comprising a plurality of neural network layers configured to decompose the image and a representation therein of the object of interest and at least some of the context associated with the object of interest to extract features therefrom and to derive a digital signature representing a combination of the object of interest and at least some of the context associated with the object of interest. For example, in some embodiments, the digital signature may be derived based on the object of interest and at least some context associated with the object of interest, such as one or more objects in the reference image other than the object of interest. In this regard, the apparatus, such as the signature encoding module 20, is configured to generate the digital signature by analyzing the image at different (e.g., higher) resolutions and extracting additional features from the reference image as the reference image is advanced from a courser resolution processed by one neural network layer to a finer resolution processed by another, subsequent neural network layer.

In some embodiments, the digital signature may comprise a sequence of bits and bytes unique to the object of interest and the associated context. In this regard, the digital signature may be derived based on both the object of interest and at least some of its context such that different digital signatures would be generated for identical objects of interest if those objects of interest were in different locations with different context associated therewith. In other words, a digital signature may be a portable, compact digital representation of an object of interest, such as a place, structure, or entity, that can be used to locate the object of interest using computer vision.

In some alternative embodiments, the apparatus 10 include means, such as the processing circuitry 12, memory 14, communication interface 16, and/or the like, for obtaining a digital signature for an object of interest at a particular location. For example, the apparatus 10 may obtain a digital signature for an object of interest by receiving the digital signature from an external device, such as a client device. In this regard, rather than determining a digital signature from a received image (e.g., as shown in operations 201 and 202), the apparatus 10 may include means, such as the processing circuitry 12, memory 14, communication interface 16, and/or the like, for receiving a digital signature from a client device.

Regardless of how the digital signature is obtained, at operation 203, the apparatus 10 includes means, such as the processing circuitry 12, memory 14, and/or the like, for identifying whether the location of the object of interest is associated with a previously determined digital signature. For example, using the digital signature determined for the received image, the apparatus 10, such as the processing circuitry 12, may access a database (e.g., database 24) in order to determine whether the object of interest has been previously identified (e.g., a previously determined digital signature is stored in association with the location of the object of interest).

In some embodiments, previously determined digital signatures stored in the database 24 may be stored in association with location information, for example, latitude and longitude coordinates that identify where the particular object of interest associated with the digital signature is located. In order to increase the efficiency with which a previously determined digital signature is identified, the apparatus 10 may access and search only a portion of the database, e.g., stored digital signatures that have been identified to be proximate to, such as within a predefined distance of, the estimated location of the object of interest and/or the image capture device at the time at which the received image was captured.

At decision point 204, if a previously determined digital signature is not identified for the location of the object of interest, the method may continue to operation 205, wherein the apparatus 10 includes means, such as the processing circuitry 12, memory 14, and/or the like, for storing the digital signature. For example, the digital signature (as determined in operation 202) may be stored (e.g., in database 24) in association with location information of the object of interest (e.g., latitude and longitude coordinates), thereby supplementing the database (e.g., database 24) that stores the digital signatures associated with objects of interest at different locations.

However, if a previously determined signature is identified for the location of the object of interest, the method may continue to operation 210 of FIG. 2B, wherein the apparatus 10 includes means, such as the processing circuitry 12, memory 14, and/or the like, for determining whether a difference between the digital signature and the previously determined digital signature satisfies a predefined criterion. In some embodiments, the difference may comprise a result of a distance function that is applied to the digital signature and the previously determined digital signature. In this regard, the apparatus 10 includes means, such as the processing circuitry 12, memory 14, and/or the like, for determining the difference between the digital signature and the previously determined digital signature. For example, the apparatus 10 may include means, such as the processing circuitry 12, memory 14, and/or the like, for separately applying a distance function to the digital signature and the previously determined digital signature. In some embodiments, a digital signature for the object of interest may comprise multiple digital signatures corresponding to different portions of the object of interest (as well as context associated with the object of interest). For example, a digital signature for a building may include a digital signature specifically for the area of the main entrance of the building. In this regard, difference between portions of the digital signature for the object of interest and a previously determined digital signature may be determined as well as differences in the entirety of the digital signature. For example, while the structure of the building may remain the same, the building may have undergone renovations to the front entrance, e.g., replacing a push/pull door with a revolving door entrance. In this regard, a digital signature for the entrance of the building may change while the remaining digital signature(s) for the building remain the same.

The result of the distance function (e.g., the difference between the digital signature and the previously determined digital signature) may then be compared to a predefined criterion, such as a threshold value or other predefined criterion. Reliance upon a predefined criterion allows not only for a comparison to a predefined numerical value, but also for more complex comparisons. For example, the predefined criterion of some example embodiments may vary based on one or more factors, such as the application being executed that is reliant upon this comparison, the type of object that is identified by the digital signature, etc. At decision point 211, if the difference satisfies the predefined criterion, the method may end and return to operation 201 of FIG. 2A, wherein more images and/or digital signatures can continue to be received and analyzed. In this regard, if the difference satisfies the predefined criterion, the digital signature and the previously determined digital signature may match or be nearly identical, such that it may be determined that the object of interest has not undergone a significant change to warrant an update and/or revision to the previously determined digital signature and/or to a map or other model at the location.

However, if the difference fails to satisfy the predefined criterion, such that the difference is indicative of a significant change to the object of interest, the method continues to operation 212, wherein the apparatus 10 includes means, such as the processing circuitry 12, memory 14, communication interface 16, and/or the like, for causing information regarding the object of interest at the particular location to be collected. In some embodiments, the apparatus 10 includes means, such as the processing circuitry 12, memory 14, communication interface 16, and/or the like, for signaling an indication of a mismatch between the digital signature and the previously determined digital signature. For example, an indication may be displayed (e.g., via user interface 18) or transmitted to a remote system (e.g., a system configured to generate and/or maintain mappings and/or models) to alert an engineer or the like that the location and/or object of interest should be reviewed and/or updated, such as to confirm the change in the object of interest and/or to collect additional information regarding the object of interest.

In some embodiments, the information that is collected may be stored in association with the location of the object of interest. For example, updated information regarding the object of interest at the location may be determined by further processing the received image of the object of interest. Turning briefly to FIG. 3, at operation 301, the apparatus 10 of an example embodiment includes means, such as the processing circuitry 12, memory 14, and/or the like, for processing the one or more images to extract one or more features of the object of interest. One example of a feature of the object of interest may be a business name for the object of interest. For example, an object of interest such as a gas station may change owners and/or gas companies such that new signage is displayed on the gas station, resulting in a revision to the previously determined digital signature (for the previous company). In this regard, information such as the business name of the object of interest may need to be updated in the database in addition to the stored digital signature for the location of the current object of interest. At operation 302, the apparatus 10 of this example embodiment includes means, such as the processing circuitry 12, memory 14, and/or the like, for storing an indication of the one or more features in association with the location of the object of interest. Any of a number of applications may, in turn, utilize the updated information in the database, such as mapping and navigation applications, social media applications, etc. Thus, these applications that rely upon the updated information may perform accurately by identifying objects of interest that are up-to-date, such as by depicting the current objects of interest in a map or referencing the current objects of interest in relation to the provision of navigational directions.

Returning to FIG. 2B, in some embodiments, the method may continue to operation 213, such that the apparatus 10 includes means, such as the processing circuitry 12, memory 14, and/or the like, for causing an update to the previously determined digital signature based at least on the digital signature. In some embodiments, the update comprises causing the digital signature, as opposed the previously determined digital signature, to be associated with the particular location. For example, the apparatus 10 may replace the previously determined digital signature stored in the database with the newly obtained digital signature. In this regard, an update to the previously determined signature may be automatically performed in instances in which a mismatch between a digital signature and a previously determined signature is identified, as described above. In this regard, stored digital signatures may be maintained and kept up-to-date in the database.

In some embodiments, updates of the stored previously determined digital signature and collection of information, such as feature extraction of the image may not be advantageous for each or a single detection of a mismatch between digital signatures. For example, an object of interest, such as department store, may have a delivery truck parked in front of the store one day a week. In this regard, the process of digital signature revision and/or feature extraction should not be triggered by a single detection of a mismatch in digital signatures, due to events such as a bus or delivery truck partially blocking the location and causing digital signatures to meaningfully differ. In some embodiments, information regarding the object of interest at the particular location to be collected (as shown in operation 212) is further based on a plurality of mismatches between the digital signature and the previously determined digital signature in which the difference repeatedly fails to satisfy the predefined criterion over a predefined period of time. In some embodiments, a record of mismatches between digital signatures may be stored (e.g., in database 24) and updated at each mismatch. For example, if a predefined number of mismatches occur over a predefined period, such as two weeks, without a match (an instance in which there is no or little difference between a digital signature and the previously determined digital signature) occurring during that period, the apparatus 10, such as the processing circuitry 12, may cause an update of the previously determined signature. In this regard, a number of mismatches with no matches over a predefined period of time may indicate that the object of interest has undergone a lasting change and is not the product of a temporary change in appearance, such as may be attributable to a delivery truck partially blocking the object of interest, such that the stored digital signature for the object of interest should be updated.

Although described above in relation to relatively short term changes in appearance, e.g., blocking of a portion of a store front by a delivery truck, the temporary change in appearance may be longer term, while still being temporary. By way of example but not of limitation, some stores may change their window displays, signage, etc. on a seasonal basis, such as by changing in mid-to-late November to celebrate the holiday season and not returning to their conventional displays, signage, etc. until mid-January. In this instance, it again may not be advantageous to update the stored previously determined digital signature and to collect information, such as by feature extraction from the image, for such seasonal changes. As such, the criterion may be predefined in this example embodiment to only provide for comparison to a previously determined digital signature throughout that portion of the year that is not impacted by the seasonal changes. During the season in question during which a store has changed its window displays, signage, etc., the criterion may be defined either not to make a comparison with the previously determined digital signature, or to make a comparison to a different digital signature that has also been previously determined, albeit for the store as adorned by its seasonal displays. As such, during the season in question, the previously determined digital signature will not be updated and information regarding the appearance of the store will not be collected so long as the digital signature of the store that is determined from an image of the store matches the previously determined digital signature of the store as adorned for the season. Although examples are provided herein, a wide variety of temporary changes, both longer in term and shorter in term, may occur for which it may not be advantageous to update the previously determined digital signature and to collect information, such as by feature extraction from the image depicting the change, so long as the change is temporary.

As described above, although the object of interest within an image may be identified in various manners, the object of interest within the image that has been captured by the image capture device may be identified by a trained query processing module 22 in one example embodiment. The query processing module may comprise a deep learning model, such as a neural network, e.g., a convolutional neural network (CNN) and, more particularly, a Residual Neural Network (ResNet). The query processing module of an example embodiment may also comprise a pyramidal structure of neural network layers configured to extract features from one or more query images and to utilize the digital signature to identify the corresponding object of interest within the one or more query images.

The query processing module 22 may be trained by using: (i) one or more digital signatures of respective objects of interest and the context associated therewith and (ii) one or more query images, in order to identify the object of interest within the one or more query images based upon the digital signature of the same object of interest in combination with the context with which the object of interest is associated. As described above, "context" may refer to a portion of an image that is adjacent to or surrounds the object of interest. For example, in an instance in which the object of interest in a reference image is a particular building, the context may comprise one or more buildings or other objects that are in close proximity to the particular building. In an embodiment in which the object of interest is demarcated, such as with an image mask, the context is generally represented by a portion of the reference image that is outside of, but adjacent or otherwise proximate to the image mask. In at least some embodiments, the object of interest is stationary (e.g., a building), and the context surrounding the object of interest is also stationary (e.g., neighboring buildings, locations, or the like).

By taking into account the context associated with an object of interest in the generation of the digital signature, a particular instance of the object of interest may be identified within a query image. For example, in an example embodiment in which the object of interest is a particular franchised restaurant located at a specific location, the generation of a digital signature of the particular restaurant that takes into account the context associated the specific location permits the particular restaurant to be distinguished from other restaurants of the same franchise that are at different locations. Although the different restaurants may all have the same appearance, the context associated with the restaurants is different from one restaurant to another, thereby allowing the digital signature to distinguish the restaurants. By taking the context associated with an object of interest into account in the generation of the digital signature, the query processing module is capable of identifying a particular object of interest within a query image even if occlusions or distortions in the query image prevent the particular object of interest from being fully visible in the query image.

In some embodiments, the method, apparatus 10 and computer program product may be configured to train the query processing module 22 to identify objects of interest within an image by utilizing digital signatures of various objects of interest that have been identified in one or more reference images as well as at least some of the context associated with the objects of interest. Although the digital signatures that are utilized by the query processing module for comparative purposes may be generated in various manners, the method, apparatus and computer program product of an example embodiment are configured to train a signature encoding module 20 to generate a digital signature representative of an object of interest and at least some of the context associated with the object of interest within a reference image and to correspondingly train the query processing module to utilize the digital signature to identify the object of interest within the image captured by an image capture device. In this regard, a trained query processing module may be trained to efficiently recognize and highlight objects of interest within images.

The query processing module 22 may be trained concurrently with a signature encoding module 20, in some embodiments described further below. In some embodiments, the signature encoding module and query processing module may be configured in various manners, but, in one embodiment, are each deep learning models. The respective deep learning models of the signature encoding module and the query processing module may be trained concurrently. As shown in FIG. 4, by way of example, but not of limitation, the signature encoding module 420 and/or the query processing module 430 may each comprise a pyramidal network and, in one embodiment, a CNN, such as a ResNet. In some embodiments, the query processing module 430 may include an aggregating layer configured to combine a digital signature generated by the signature encoding module with a query image 445 decomposition.

The signature encoding module 420 may be configured, using a reference image 405 having an area 410 of the image demarcated (e.g., by masking the reference image) to signify an object of interest (e.g., place of interest, or the like), to generate one or more digital signatures (e.g., sequences of bytes) that represent the object of interest in the context of the reference image. While reference images may be demarcated by using image masks during the training process, it is to be appreciated that other methods of demarcation may be used. As also described below, digital signatures (e.g., digital signatures generated by the signature encoding module 420) are dependent not only upon the object of interest, but also upon at least some of the context associated with the object of interest. This context may include the environment or other surroundings located about the object of interest. In other words, the context associated with an object of interest is context that is visible when viewing the object of interest and, for at least some objects of interest, is external to the object of interest. By way of example, in an instance in which a particular building is the object of interest, the context may include other adjacent buildings as well as other features, e.g., statues, street signs, open spaces, etc., in the vicinity of the building.

During training, a provided reference image 405 depicts an object of interest. For example, the reference image may be an image generated by a camera (e.g., a photograph or a frame from a video) such that the image depicts real-world content (e.g., buildings, roads, signs, landmarks, and/or other objects). In this regard, the object of interest may be content that is desired to be located in one or more other images. The object of interest is stationary in at least some example embodiments.

Further, during training, the reference image may be modified such that the object of interest within the reference image is demarcated. The object of interest may be demarcated in the reference image in various manners. For example, in some embodiments, in addition to a reference image, an image mask that demarcates the object of interest in the reference image may also be provided to the signature encoding module. For example, an image mask may take the form of a matrix having elements that correspond to one or more pixels of the reference image. In this example embodiment, the matrix may be configured to designate certain pixels of the reference image that include the object of interest. In other embodiments, the object of interest may be demarcated within the reference image itself. Demarcation of the object of interest may occur prior to the reference image being provided to the signature encoding module 420.

Once the reference image and demarcation of the object of interest within the reference image are provided to the signature encoding module 420, the signature encoding module may generate a digital signature for the object of interest and for at least some context associated with the object of interest.

In some embodiments, the signature encoding module 420 may comprise a plurality of neural network layers configured to decompose the reference image and a representation therein of the object of interest and at least some of the context associated with the object of interest to extract features therefrom and to derive a digital signature representing a combination of the object of interest and at least some of the context associated with the object of interest. For example, in some embodiments, the digital signature may be derived based on the object of interest and at least some context associated with the object of interest, such as one or more objects in the reference image other than the object of interest.

In some embodiments, digital signatures may be generated by analyzing the reference image at different (e.g., higher) resolutions and extracting additional features from the reference image as the reference image is advanced from a courser resolution processed by one neural network layer to a finer resolution processed by another, subsequent neural network layer.

As FIG. 4 illustrates, a signature encoding module 420 is provided with a reference image 405 having a demarcated object 410 of interest. As shown, the signature encoding module 420 comprises a plurality of neural network layers in a pyramidal structure configured to decompose the reference image and a representation therein of the object of interest to extract features therefrom. As a result, the signature encoding module is configured to derive a digital signature 440 representing the object of interest that was demarcated in the reference image along with at least some of the context associated with the object of interest.

In some embodiments, the digital signature may comprise a sequence of bits and bytes unique to the object of interest and the associated context. In this regard, the digital signature may be derived based on both the object of interest and at least some of its context such that different digital signatures would be generated for identical objects of interest if those objects of interest were in different locations with different context associated therewith.

In some embodiments, the signature encoding module 420 and query processing module 430 may perform operations on multiple images (e.g., reference images 405 and query images 445) concurrently during the training process. In some embodiments, once a digital signature is generated by the signature encoding module, the digital signature may be stored (e.g., in memory and/or database 24) and used in other processes (e.g., query processing module processes) without having to use the original reference images and associated masks. In this regard, the stored digital signature provides a compact representation of an object of interest, thereby providing a technical advantage in terms of storage efficiency and the speed and efficiency with which digital signatures representative of objects of interest may be retrieved and processed, such as in conjunction with the identification of an object of interest within a query image. The digital signatures may be stored in combination with information defining the location at which the respective reference image was captured and, in some embodiments, in combination with a representation of the image, such as an encoded representation, e.g., a hash, of the image or the actual image itself.

In the training process, once the object of interest has been identified in the query image 445, at least one of the signature encoding module 420 or the query processing module 430 may be modified based upon a difference between the object of interest identified within the query image and the object of interest marked in the reference image. For example, the object of interest identified within the query image and the object of interest marked in the reference image may be compared using a loss function with at least one of the signature encoding module or the query processing module then being modified based upon a result of the loss function. In some embodiments, at least one of the signature encoding module and the query processing module may be modified to reduce a difference between the object of interest identified within the query image and the object of interest marked in the reference image.

By repeating the foregoing process a plurality of times by providing the signature encoding module 420 with a reference image with an object of interest being marked therein and then utilizing the resulting digital signature as an input along with one or more query images 445 to the query processing module 430 and then modifying the signature encoding module and/or the query processing module based upon a difference between the object of interest identified within the query image and the object of interest marked in the reference image, the signature encoding module and the query processing module may be trained to perform more accurately. In this regard, the signature encoding module may be trained to generate digital signatures that permit an object to interest to be accurately identified, and the query processing module may be trained to accurately identify the object of interest based upon a digital signature representative of the object of interest and at least some of the context associated therewith. Moreover, as a result of the training of the signature encoding module, the context (such as in terms of the amount of the context and/or the type of context) that is included with the object of interest in conjunction with the generation of the digital signature is a function of the training of the signature encoding process with the context that is included being defined to be that context that allows digital signatures to be generated that permit an object to interest to be accurately identified.

Although a signature encoding module 20 may be utilized to generate a plurality of digital signatures representative of respective objects of interest as well as at least some context associated therewith, the digital signatures may be generated in other manners and stored for subsequent reference by the query processing module 22 in other example embodiments. Additionally, even in instances in which the digital signatures are generated by a signature encoding module 20 that is trained concurrently with the training of the query processing module 22, the apparatus 10 including the query processing module 22 may subsequently reference the digital signatures in order to identify an object of interest in a query image that has been captured by an image capture device without further involvement by the signature encoding module 20.

By utilizing the digital signatures, changes to objects of interest may be efficiently identified in a manner that conserves processing resources and is more timely than at least some other image analysis techniques. In this regard, utilizing digital signatures to accurately and efficiently identify changes to objects of interest within images and cause updating to stored digital signatures representative of the objects of interest results in models and/or mappings that are more accurate and are maintained and updated in real-time.

FIGS. 2A, 2B, and 3 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, although a supervised learning technique has been described in conjunction with the training of the signature encoding module 20 and the query processing module 22, various forms of unsupervised learning or partially supervised learning may, instead, be employed in other example embodiments. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving one or more images generated by an image capture device, the one or more images comprising a predetermined object of interest at a particular location, the object of interest being identified or demarcated through an image recognition process;
   determining a digital signature representing the object of interest at the particular location via a deep learning model comprising a trained signature encoding module, wherein the trained signature encoding module is configured to generate the digital signature by extracting features from a respective image of the one or more images using a neural network;

determining whether a difference between the digital signature and a previously determined digital signature associated with the particular location satisfies a predefined criterion; and responsive to determining (i) that the difference fails to satisfy the predefined criterion, thereby indicating a change to the object of interest, and (ii) that the difference has failed to satisfy the predefined criterion a predefined number of times over a predefined period of time:

causing information regarding the object of interest at the particular location to be collected.

2. The method of claim 1, further comprising:
identifying the previously determined digital signature that is associated with the particular location prior to determining the difference between the digital signature and the previously determined digital signature.

3. The method of claim 1, further comprising:
determining the difference between the digital signature and the previously determined digital signature, wherein determining the difference comprises:
applying a distance function to the digital signature and the previously determined digital signature, wherein the difference comprises a result of the distance function.

4. The method of claim 1, further comprising causing an indication of a mismatch between the digital signature and the previously determined digital signature to be signaled in an instance in which the difference fails to satisfy the predefined criterion.

5. The method of claim 1, further comprising, in accordance with determining that the difference fails to satisfy the predefined criterion:
causing the digital signature, as opposed the previously determined digital signature, to be associated with the particular location.

6. The method of claim 1, wherein causing information regarding the object of interest at the particular location to be collected comprises:
processing the one or more images to extract one or more features of the object of interest; and
storing an indication of the one or more features in association with the object of interest.

7. The method of claim 1, wherein the digital signature and the previously determined digital signature are each based on respective images of the object of interest captured from a same viewing direction.

8. An apparatus comprising processing circuitry and at least one memory including computer program code instructions, the computer program code instructions configured to, when executed by the processing circuitry, cause the apparatus to:
receive one or more images generated by an image capture device, the one or more images comprising a predetermined object of interest at a particular location, the object of interest being identified or demarcated through an image recognition process;
determine a digital signature representing the object of interest at the particular location via a deep learning model comprising a trained signature encoding module, wherein the trained signature encoding module is configured to generate the digital signature by extracting features from a respective image of the one or more images using a neural network;

determine whether a difference between the digital signature and a previously determined digital signature associated with the particular location satisfies a predefined criterion; and responsive to determining (i) that the difference fails to satisfy the predefined criterion, thereby indicating a change to the object of interest, and (ii) that the difference has failed to satisfy the predefined criterion a predefined number of times over a predefined period of time:

cause information regarding the object of interest at the particular location to be collected.

9. The apparatus of claim 8, wherein the computer program code instructions are further configured to, when executed by the processing circuitry, cause the apparatus to:
identify the previously determined digital signature that is associated with the particular location prior to determining the difference between the digital signature and the previously determined digital signature.

10. The apparatus of claim 8, wherein the computer program code instructions are further configured to, when executed by the processing circuitry, cause the apparatus to:
determine the difference between the digital signature and the previously determined digital signature, wherein determining the difference comprises:
applying a distance function to the digital signature and the previously determined digital signature, wherein the difference comprises a result of the distance function.

11. The apparatus of claim 8, wherein the computer program code instructions are further configured to, when executed by the processing circuitry, cause the apparatus to:
cause an indication of a mismatch between the digital signature and the previously determined digital signature to be signaled in an instance in which the difference fails to satisfy the predefined criterion.

12. The apparatus of claim 8, wherein the computer program code instructions are further configured to, when executed by the processing circuitry, cause the apparatus to, in accordance with determining that the difference fails to satisfy the predefined criterion:
cause to the digital signature, as opposed to the previously determined digital signature, to be associated with the particular location.

13. The apparatus of claim 8, wherein the computer program code instructions that are configured to cause information regarding the object of interest at the particular location to be collected are further configured to, when executed by the processing circuitry, cause the apparatus to:
process the one or more images to extract one or more features of the object of interest; and
store an indication of the one or more features in association with the object of interest.

14. The apparatus of claim 8, wherein the digital signature and the previously determined digital signature are each based on respective images of the object of interest captured from a same viewing direction.

15. A computer program product comprising at least one non-transitory computer-readable storage medium having computer-executable program code instructions stored therein, the computer-executable program code instructions comprising program code instructions configured to:
receive one or more images generated by an image capture device, the one or more images comprising a predetermined object of interest at a particular location, the object of interest being identified or demarcated through an image recognition process;

determine a digital signature representing the object of interest at the particular location via a deep learning model comprising a trained signature encoding module, wherein the trained signature encoding module is configured to generate the digital signature by extracting features from a respective image of the one or more images using a neural network;

determine whether a difference between the digital signature and a previously determined digital signature associated with the particular location satisfies a predefined criterion; and responsive to determining (i) that the difference fails to satisfy the predefined criterion, thereby indicating a change to the object of interest, and (ii) that the difference has failed to satisfy the predefined criterion a predefined number of times over a predefined period of time:

cause information regarding the object of interest at the particular location to be collected.

16. The computer program product of claim 15, wherein the signature encoding module is configured to generate the digital signature by extracting features from a respective image of the one or more images as the respective image is advanced from a courser resolution to a finer resolution processed by subsequent neural network layers of the signature encoding module.

17. The computer program product of claim 15, wherein the computer-executable program code instructions further comprise program code instructions configured to:

identify the previously determined digital signature that is associated with the particular location prior to determining the difference between the digital signature and the previously determined digital signature.

18. The computer program product of claim 15, wherein the computer-executable program code instructions further comprise program code instructions configured to:

determine the difference between the digital signature and the previously determined digital signature, wherein determining the difference comprises:

applying a distance function to the digital signature and the previously determined digital signature, wherein the difference comprises a result of the distance function.

19. The method of claim 1, wherein the signature encoding module is configured to generate the digital signature by extracting features from a respective image of the one or more images as the respective image is advanced from a courser resolution to a finer resolution processed by subsequent neural network layers of the signature encoding module.

20. The apparatus of claim 8, wherein the signature encoding module is configured to generate the digital signature by extracting features from a respective image of the one or more images as the respective image is advanced from a courser resolution to a finer resolution processed by subsequent neural network layers of the signature encoding module.

* * * * *